United States Patent
Murison et al.

(10) Patent No.: US 7,667,889 B2
(45) Date of Patent: Feb. 23, 2010

(54) METHODS AND SYSTEMS FOR GAIN CONTROL IN PULSED OPTICAL AMPLIFIERS

(75) Inventors: Richard Murison, St-Lazare (CA); Tullio Panarello, St-Lazare (CA); Benoit Reid, Laval (CA); Reynald Boula-Picard, Montreal (CA)

(73) Assignee: Pyrophotonics Lasers Inc., Quebec (CA)

( * ) Notice: Subject to any disclaimer, the term of this patent is extended or adjusted under 35 U.S.C. 154(b) by 0 days.

(21) Appl. No.: 12/033,744

(22) Filed: Feb. 19, 2008

(65) Prior Publication Data

US 2008/0198445 A1    Aug. 21, 2008

Related U.S. Application Data

(60) Provisional application No. 60/890,890, filed on Feb. 21, 2007.

(51) Int. Cl.
*H04B 10/17* (2006.01)
(52) U.S. Cl. ............. 359/341.3; 359/337.1; 359/341.41
(58) Field of Classification Search ............. 359/337.1, 359/341.3, 341.41
See application file for complete search history.

(56) References Cited

U.S. PATENT DOCUMENTS

| | | | | |
|---|---|---|---|---|
| 3,806,829 | A | | 4/1974 | Duston et al. |
| 5,054,876 | A | * | 10/1991 | Grasso et al. ................. 385/24 |
| 5,136,600 | A | * | 8/1992 | Fidric et al. .................... 372/32 |
| 6,317,255 | B1 | * | 11/2001 | Fatehi et al. ........... 359/341.44 |
| 6,342,965 | B1 | * | 1/2002 | Kinoshita .................... 359/334 |
| 6,462,862 | B2 | * | 10/2002 | Kinoshita .................... 359/334 |
| 6,661,947 | B2 | * | 12/2003 | Shirai .......................... 385/24 |
| 6,747,788 | B2 | * | 6/2004 | Kinoshita .................... 359/334 |
| 6,975,447 | B2 | * | 12/2005 | Kinoshita ................ 359/337.4 |
| 2002/0044324 | A1 | * | 4/2002 | Hoshida et al. ............. 359/179 |
| 2002/0126952 | A1 | * | 9/2002 | Shirai .......................... 385/24 |
| 2002/0186739 | A1 | | 12/2002 | Sandstrom et al. |
| 2004/0257643 | A1 | * | 12/2004 | Chen ....................... 359/341.4 |

FOREIGN PATENT DOCUMENTS

| | | | |
|---|---|---|---|
| JP | 015152654 A | * | 6/1993 |
| JP | 2001036169 A | * | 2/2001 |
| WO | WO 03/039044 | | 5/2003 |

OTHER PUBLICATIONS

International Search Report and Written Opinion of PCT Application No. PCT/CA2008/000329, May 12, 2008, 14 pages total.

* cited by examiner

*Primary Examiner*—Eric Bolda
(74) *Attorney, Agent, or Firm*—Townsend and Townsend and Crew LLP

(57) ABSTRACT

A method of operating an amplifier system includes providing a pump signal at a pump wavelength. The pump signal is a function of a pump power. The method also includes providing an input signal at a signal wavelength and coupling the pump signal and the input signal to an optical amplifier. The optical amplifier includes a gain medium characterized by a gain value at the signal wavelength. The method further includes amplifying the input signal to provide an output signal, detecting a feedback signal related to the gain value, and modifying the pump power based on the detected feedback signal.

23 Claims, 6 Drawing Sheets

METHODS AND SYSTEMS FOR GAIN CONTROL IN PULSED OPTICAL AMPLIFIERS

CROSS-REFERENCES TO RELATED APPLICATIONS

This application claims priority to U.S. Provisional Patent Application No. 60/890,890, filed on Feb. 21, 2007, the disclosure of which is hereby incorporated by reference in its entirety for all purposes.

BACKGROUND OF THE INVENTION

The present invention relates generally to the field of optical amplifiers and lasers. More particularly, the present invention relates to a method and apparatus for providing high power pulsed laser sources useful for industrial applications such as trimming, marking, cutting, and welding. Merely by way of example, the invention has been applied to a laser source with real-time tunable characteristics including pulse width, peak power, repetition rate, and pulse shape. However, the present invention has broader applicability and can be applied to other laser sources.

Conventional laser-based material processing has generally used high peak power pulsed lasers, for example, Q-switched Nd:YAG lasers operating at 1064 nm, for marking, engraving, micro-machining, and cutting applications. More recently, laser systems based on fiber gain media have been developed. In some of these fiber-based laser systems, fiber amplifiers are utilized.

Some optical amplifiers and lasers utilizing a fiber gain medium are optically pumped, often by using semiconductor pump lasers. The fiber gain medium is typically made of silica glass doped with rare-earth elements. The choice of the rare-earth elements and the composition of the fiber gain medium depend on the particular application. One such rare-earth element is ytterbium, which is used for optical amplifiers and lasers emitting in the 1020 nm-1100 nm range. Another rare-earth element used in some fiber gain media is erbium, which is used for optical amplifiers and lasers emitting in the 1530 nm-1560 nm range.

The wavelength of the optical pump source used for ytterbium-doped fiber amplifiers and lasers is typically in the wavelength range of 910 nm to 980 nm. The wavelength of the optical pump source used for erbium-doped fiber amplifiers and lasers is typically in a wavelength range centered at about 980 nm or about 1480 nm.

When the laser is operated in a pulse-on-demand mode, the first optical pulse in a series of pulses tends to be more powerful than the following pulses in the series. This situation is sometimes referred to as the first pulse problem and occurs because the energy stored in the laser gain medium, which is depleted significantly after the first pulse, is not fully replenished by the time the next pulse passes through the gain medium. It is possible that if the next pulse arrives after the gain medium is recovered fully, then another pulse similar to the first pulse will be produced. Hence, depending on the pulse repetition rate, which can be varied during the laser operation, the energy in each pulse will generally vary as a function of the state of the gain medium. In laser processing applications, this behaviour is generally undesirable because of the inconsistency in laser pulses and the results achieved during processing operations.

In systems designed to produce a series of high power pulses, the output pulse energy is related to the energy stored in the optical amplifier, which is related to the gain. Generally, to achieve a high energy per pulse, a high gain needs to be created in the optical amplifier, which typically amplifies the first pulse at the expense of the following pulses. If the pulse repetition rate is reduced to enable the gain to recover between pulses, the high gain present in the optical amplifier can create instabilities in the gain medium. Thus, there is a need in the art for high peak power fiber-based amplifiers with repeatable pulse amplification characteristics over a range of pulse repetition frequencies.

SUMMARY OF THE INVENTION

According to an embodiment of the present invention, a method of operating an amplifier system is provided. The method includes providing a pump signal at a pump wavelength. The pump signal is a function of a pump power. The method also includes providing an input signal at a signal wavelength and coupling the pump signal and the input signal to an optical amplifier. The optical amplifier includes a gain medium characterized by a gain value at the signal wavelength. The method further includes amplifying the input signal to provide an output signal, detecting a feedback signal related to the gain value, and modifying the pump power based on the detected feedback signal.

According to another embodiment of the present invention, an amplifier system is provided. The amplifier system includes a pump source adapted to receive a drive signal and output a pump signal and an optical amplifier adapted to receive an input signal. The optical amplifier has an input coupled to the pump source and an output. The amplifier system also includes a wavelength demultiplexer coupled to the output of the optical amplifier and a detector optically coupled to the wavelength demultiplexer. The amplifier system further includes a feedback system coupled to the detector and adapted to modify the drive signal for the pump source.

According to an alternative embodiment of the present invention, an amplifier system is provided. The amplifier system includes a pump source adapted to receive a drive signal and output a pump signal and an optical amplifier adapted to receive an input signal. The optical amplifier has an input coupled to the pump source and an output. The amplifier system also includes a signal separator (e.g., an optical circulator or a wavelength demultiplexer) coupled to the input of the optical amplifier and a detector optically coupled to the signal separator. The amplifier system further includes a feedback system coupled to the detector and adapted to modify the drive signal for the pump source.

According to some embodiments, dynamic gain control is used with optical amplifiers to amplify sequences of optical pulses to high energy. The sequence of optical pulses may not be equally separated in time, and have pulse widths and pulse energies that can be individually set from pulse to pulse. Industrial applications include trimming, marking, cutting, welding, and the like. Merely by way of example, the invention has been applied to high peak power Ytterbium-doped fiber laser amplifiers. However, the present invention has broader applicability and can be applied to other sources.

According to a further embodiment of the present invention, a method of providing a series of amplified tunable laser pulses is provided. The method includes providing a seed signal at a first port of an optical amplifier. The method further provides for an optical pumping means injected into the optical amplifier. The method further includes controlling the optical amplifier gain by providing an electrical feedback loop circuit on the optical pumping means power level, such that the residual pump light power or the amplified spontaneous emission power is maintained at a pre-determined level.

Numerous benefits are achieved using the present invention over conventional techniques. For example, in an embodiment according to the present invention, high peak power pulses are generated with pulse characteristics that are tunable in real-time while maintaining pulse-to-pulse characteristics. Furthermore, in an embodiment according to the present invention, the first pulse problem is minimized. Various additional objects, features and advantages of the present invention can be more fully appreciated with reference to the detailed description and accompanying drawings that follow.

DETAILED DESCRIPTION OF SPECIFIC EMBODIMENTS

Figure 1:
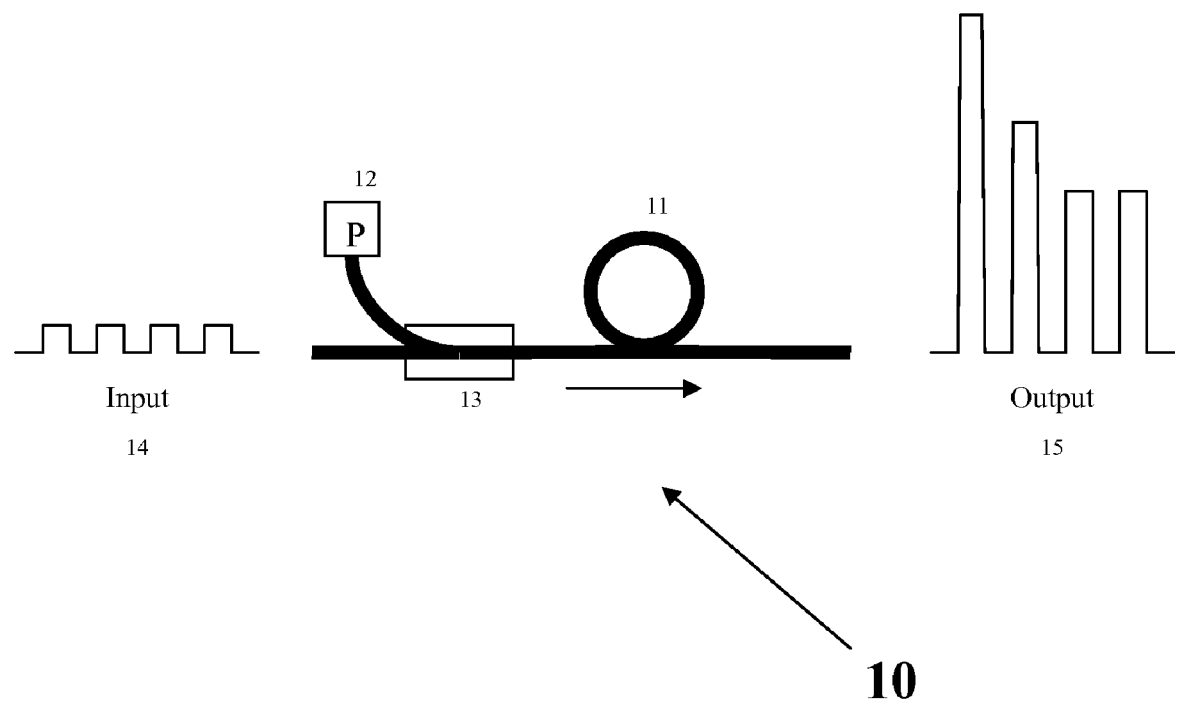
FIG. 1 is a simplified schematic illustration of a conventional high power pulsed fiber amplifier.

FIG. 1 is a simplified schematic illustration of a conventional fiber amplifier 10. The fiber amplifier includes a rare-earth-doped fiber gain medium 11. The rare-earth doping is typically Ytterbium for amplification of light in wavelength range around 980 nm to 1100 nm. Other rare-earth elements, like Erbium, Neodymium, or Thulium, can be used for amplification at other wavelengths. The fiber gain medium is optically pumped by at least one semiconductor laser 12, which is coupled to the fiber gain medium by a combiner 13, as is well known in the art. A low energy input optical pulse train 14 is substantially amplified by the optical amplifier 10 to become a high energy output optical pulse train 15.

According to FIG. 1, the substantially similar pulses of the input train 14 are amplified to produce the output train 15, which is characterized by different energy per pulse depending on the position of a pulse in the sequence. The first pulse in the sequence generally sees more gain than the following pulses because the first pulse extracts a significant fraction of the energy in the gain medium, which is not yet replenished by the time the subsequent pulses interact with the gain medium. Also if the pulse sequence is non-periodic and the time delay between some pulses is large enough for the gain to recover, generation of a high peak power pulse will happen for subsequent pulses in the sequence. The variability of energy per pulse between various pulses in the sequence is undesirable.

Along with the output optical pulse train 15 at the signal wavelength as illustrated in FIG. 1, amplified spontaneous emission (ASE) can exist, co-propagating at other wavelengths. ASE may also exit the input end of the amplifier, counter-propagating with respect to the input optical pulse train 14. Moreover, it is possible that the pump light from semiconductor laser 12 is not fully absorbed in the rare-earth gain medium 11 and, as a result, residual pump light exits at the output end of the amplifier 10 co-propagating along with the output optical pulse train 15 and ASE light.

Figure 2:
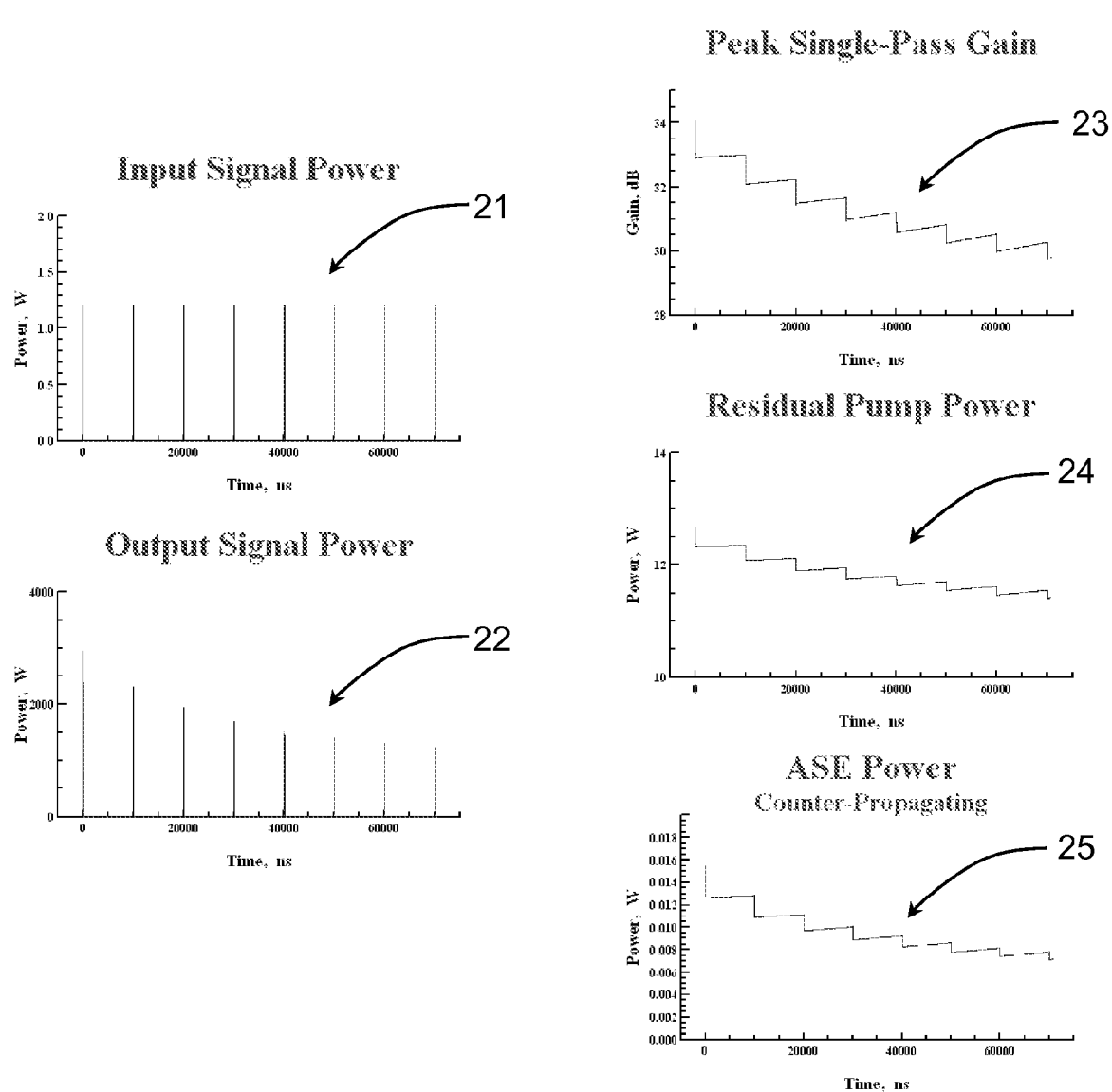
FIG. 2 illustrates simulated data for the gain, the amplified spontaneous emission, the residual pump light, and the amplified signal of a conventional high power pulsed fiber amplifier.

FIG. 2 illustrates simulated data for the gain, the amplified spontaneous emission, the residual pump light, and the amplified signal of a conventional high power pulsed fiber amplifier. As shown in FIG. 2, the input signal train 21 is amplified to produce the output signal train 22. Also shown are the gain 23, the counter-propagating ASE signal 25 exiting from the input end of the fiber amplifier, and the residual pump light 24 exiting from the output end of the fiber amplifier. In these simulations, the rare-earth-doped fiber is a 1.0 m long Ytterbium-doped double-clad fiber with a core diameter of 30 µm and an inner clad diameter of 250 µm. The small signal gain of the amplifier is about 34 dB. The input pump power at a wavelength of 976 nm is 15 W, co-propagating in the fiber with a 1 W peak power signal at a wavelength of 1030 nm. The pulse width is 20 ns and the pulse repetition rate is 100 kHz.

FIG. 2 illustrates that in conventional high power pulsed fiber amplifiers, the energy and the peak power of the various output pulses 22 are substantially non-uniform and that the first pulse of the sequence is more energetic. As discussed above, the first pulse problem results because the gain doesn't recover fully between the pulses at this repetition rate. In this example, it is possible that if the gain were limited to about 30 dB, all the pulses would be identical and similar to the last pulse of the sequence. Because the gain is dependent on the input pump power, a decrease in the gain can be achieved by decreasing the input pump power.

However limiting the input pump power results in an important drawback. In an optical amplifier, such as a fiber amplifier, the gain recovery time depends on the input pump power: higher pump power decreases the recovery time. Limiting the pump power to limit the gain has the adverse effect of making the gain recovery slower, limiting the maximum pulse repetition rate, which is undesirable.

The inventors have determined that, without limiting embodiments of the present invention, limiting the pump power before the arrival of a pulse is effective to limit the gain and that a high pump power just after a pulse is advantageous for minimizing the recovery time of the amplifier. For arbitrary pulse sequences, it is generally difficult to determine the proper pump timing sequence to achieve these goals. Hence, embodiments of the present invention monitor the amplifier gain and use the maximum pump power available to speed up the amplifier recovery until the gain reaches a pre-determined limit, at which point the pump power is set to a lower level.

Referring once again to FIG. 2, it can be seen that the residual pump light 24 and the output ASE 25 are directly related to the amount of gain in the amplifier. Therefore by monitoring and limiting one of them, it is possible to dynamically control the gain.

According to an embodiment of the present invention, dynamic gain control is implemented by providing an electrical feedback loop circuit on the optical pump power level, such that the power of the residual pump light or the amplified spontaneous emission power is maintained at a pre-determined level. According to another embodiment of the present invention, dynamic gain control is implemented by providing a feedback loop on the drive current for the pump device (e.g., a semiconductor diode laser), such that the residual pump light power or the amplified spontaneous emission power is maintained at a pre-determined level.

Figure 3A:
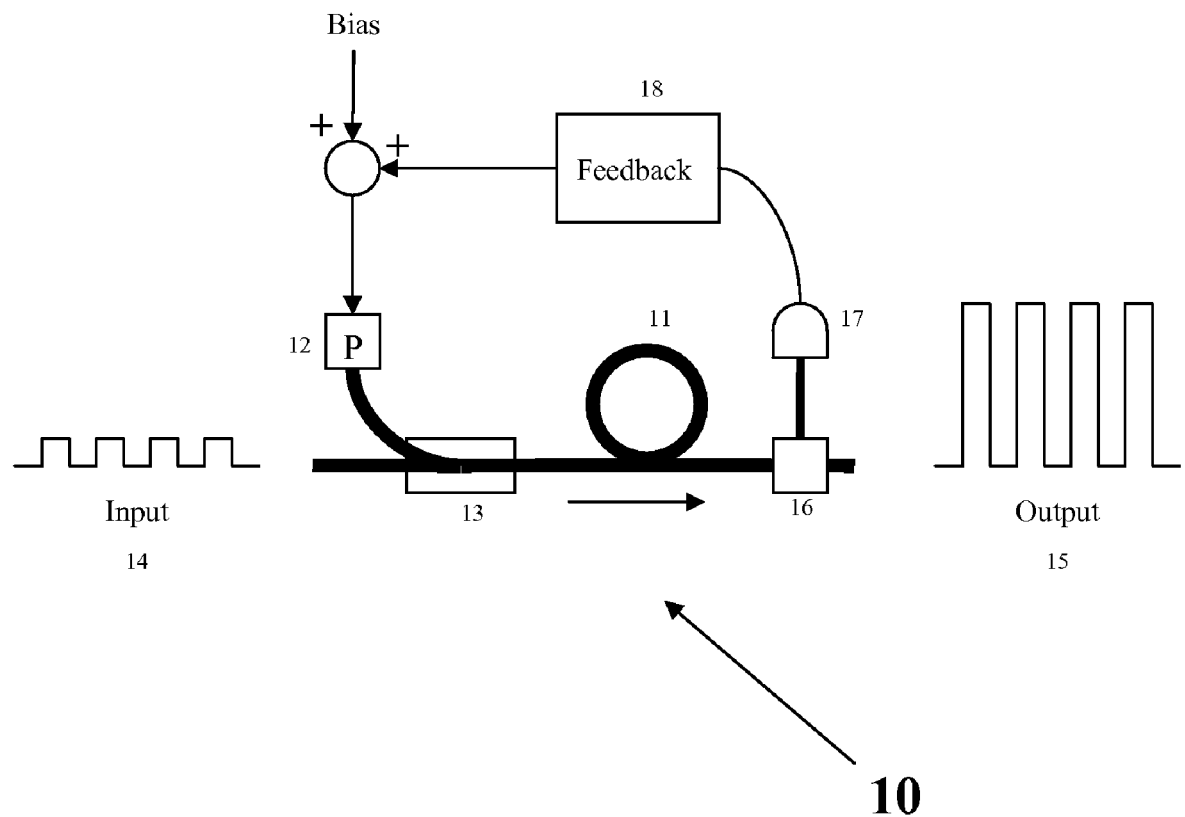
FIG. 3A is a simplified schematic illustration of a high power fiber amplifier according to an embodiment of the present invention.

FIG. 3A is a simplified schematic illustration of a high power fiber amplifier according to an embodiment of the present invention. The fiber amplifier 10 includes a rare-earth-doped fiber gain medium 11. The rare-earth doping is typically Ytterbium for amplification of light in wavelength range around 980 nm to 1100 nm. Other rare-earth elements, like Erbium, Neodymium, or Thulium, can be used for amplification at other wavelengths. According to embodiments of the present invention, the rare-earth-doped optical fiber can be single-clad, double-clad, or multi-clad. It can also be a polarization maintaining fiber.

The fiber gain medium is optically pumped by a pump source 12, (e.g., one or more semiconductor lasers), which are coupled to the fiber gain medium by a combiner 13. A low energy input optical pulse train 14 is substantially amplified by the optical amplifier 10 to become a high energy output optical pulse train 15 having a pulse-to-pulse uniformity substantially similar to the input pulse train. The co-propagating residual pump or ASE at a first wavelength is separated from the signal at the signal wavelength using a signal separator 16 and impinges on a photodetector 17. In some embodiments, the signal separator is a wavelength demultiplexer. The wavelength demultiplexer can be an all-fiber wavelength demultiplexer, a dichroic mirror, a grating, a prism, or other suitable demultiplexers. The electrical signal from the photodetector feeds an electrical feedback circuit 18, which generates a feedback current signal applied to the pump source 12 to vary its output power.

According to embodiments of the present invention, methods and systems are provided for controlling the instantaneous gain in an optical amplifier such that the optical amplifier can amplify optical pulses to high energy in a repeatable pulse train. A fast feedback loop is integrated with the optical amplifier and pump system and utilizes either the residual pump light or ASE to modify the pump signal. A fiber amplifier systems provided by an embodiment is particularly well suited for the amplification of optical pulses with constant pulse-to-pulse characteristics, thereby minimizing the first pulse problem. Additionally, in applications for variable pulse repetition rate, pulse to pulse energy, and the like, embodiments of the present invention are suitable.

In alternative embodiments of the present inventions, providing a pump signal in a double-clad fiber amplifier also includes using a multi-mode pump laser injected in the inner cladding of the fiber and a seed signal injected into the fiber core. In such a configuration, the seed signal is strongly amplified into the fiber core by grabbing power from the multi-mode pump laser. The amplified seed signal in turn then pumps the fiber core to amplify the signal pulses also propagating into the fiber core to high energy. Additional description of a fiber amplifier configured to provide core pumping of a second fiber amplifier is provided in U.S. patent application Ser. No. 11/834,472, filed on Aug. 6, 2007, the specification of which is hereby incorporated by reference for all purposes.

Figure 3B:
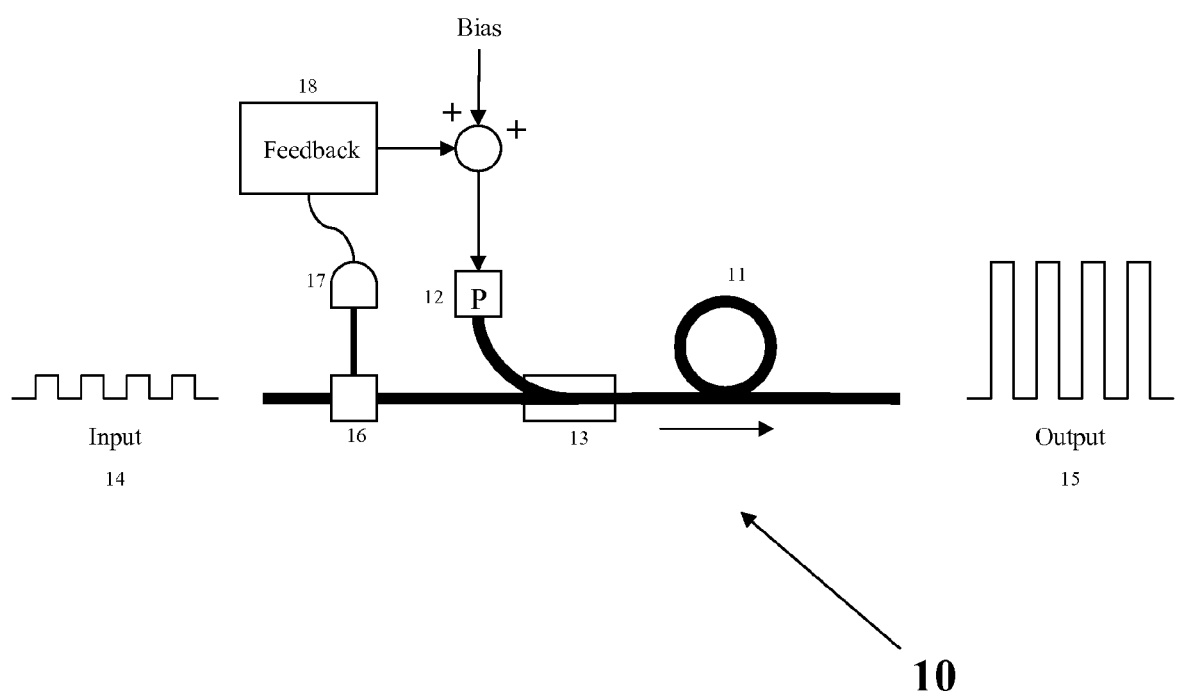
FIG. 3B is a simplified schematic illustration of a high power fiber amplifier according to another embodiment of the present invention.

FIG. 3B is a simplified schematic illustration of a high power fiber amplifier according to another embodiment of the present invention. The fiber amplifier 10 includes a rare-earth-doped fiber gain medium 11. The rare-earth doping is typically Ytterbium for amplification of light in wavelength range around 980 nm to 1100 nm. Other rare-earth elements, like Erbium, Neodymium, or Thulium, can be used for amplification at other wavelengths. The fiber gain medium is optically pumped by a pump source 12, (e.g., one or more semiconductor lasers), which are coupled to the fiber gain medium by a combiner 13. A low energy input optical pulse train 14 is substantially amplified by the optical amplifier 10 to become a high energy output optical pulse train 15 having a pulse-to-pulse uniformity substantially similar to the input pulse train. The counter-propagating residual ASE at a first wavelength is separated from the signal at the signal wavelength using a signal separator 16. In an embodiment, the signal separator is a wavelength demultiplexer and the separated signal impinges on a photodetector 17. The wavelength demultiplexer can be an all-fiber wavelength demultiplexer, a dichroic mirror, a grating, a prism, or other suitable demultiplexers. In another embodiment, the signal separator 16 is an optical circulator that separates the backward propagating wave using polarization rotation and a polarizing beamsplitter. It should be noted that the wavelength demultiplexer illustrated in FIG. 3A could also be replaced with another suitable signal separator such as an optical circulator. The electrical signal from the photodetector feeds an electrical feedback circuit 18 generating a feedback current signal applied to the pump source 12 to vary its output power.

Depending on the energy requirements of the output optical pulses, a single-clad, double-clad, or even multiple-clad fiber gain medium can be used.

Figure 4:
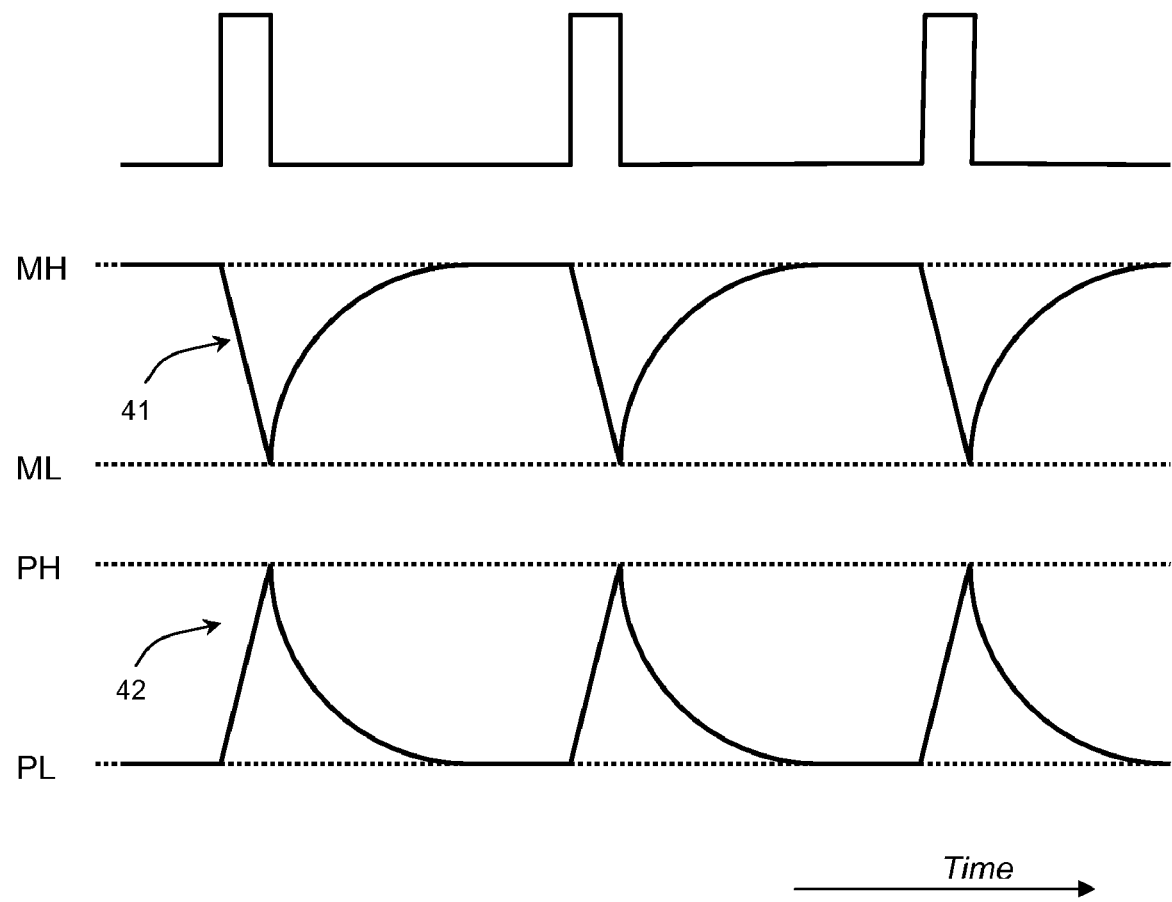
FIG. 4 is a simplified illustration of the monitor signal and the optical pump output power according to another embodiment of the present invention.

FIG. 4 is a simplified illustration of the monitor signal and the optical pump output power according to an embodiment of the present invention. The input control signal 41 comes from the photodetector that monitors the residual pump light or the ASE. With this input signal, the electrical feedback circuit generates an error signal 42 that is applied to the laser pump. Since the energy stored in the optical amplifier is depleted by the optical pulse, the control signal drops to a low level ML during the pulse. Now since the control signal is low, the amplifier gain is low and the pump power needs to be increased by increasing its drive signal to PH. Because of the high pumping power, the monitor signal eventually recovers and to limit the gain in the amplifier, it is necessary to limit the monitoring signal to a pre-determine maximum value MH, which is accomplished by dropping the pump drive signal to PL. To effectively control the gain dynamically from pulse to pulse, the electronic feedback circuit has a bandwidth larger than the maximum pulse repetition rate. An advantage provided by embodiments of the present invention is that the maximum gain, and therefore the maximum of the monitoring signal, is independent of the pulse characteristics, such as pulse width or pulse energy. Hence, the control schemes utilized by embodiments described herein are independent of the pulse sequence and are very suitable for pulse-on-demand applications.

According to embodiments of the present invention, methods and systems are provided that result in the generation of sequences of optical pulses, which may not be equally separated in time. Moreover, the pulse widths and pulse energies may be individually tailored in a predetermined manner from pulse to pulse. Furthermore, the pulses may include an arbitrary train of optical pulse sequences.

In an alternative embodiment, the pump can be positioned at the output of the amplifier or pumps can appear at both ends, thereby providing multiple residual pump lights and ASE signals for use in the monitoring and dynamic gain control processes.

Figure 5:
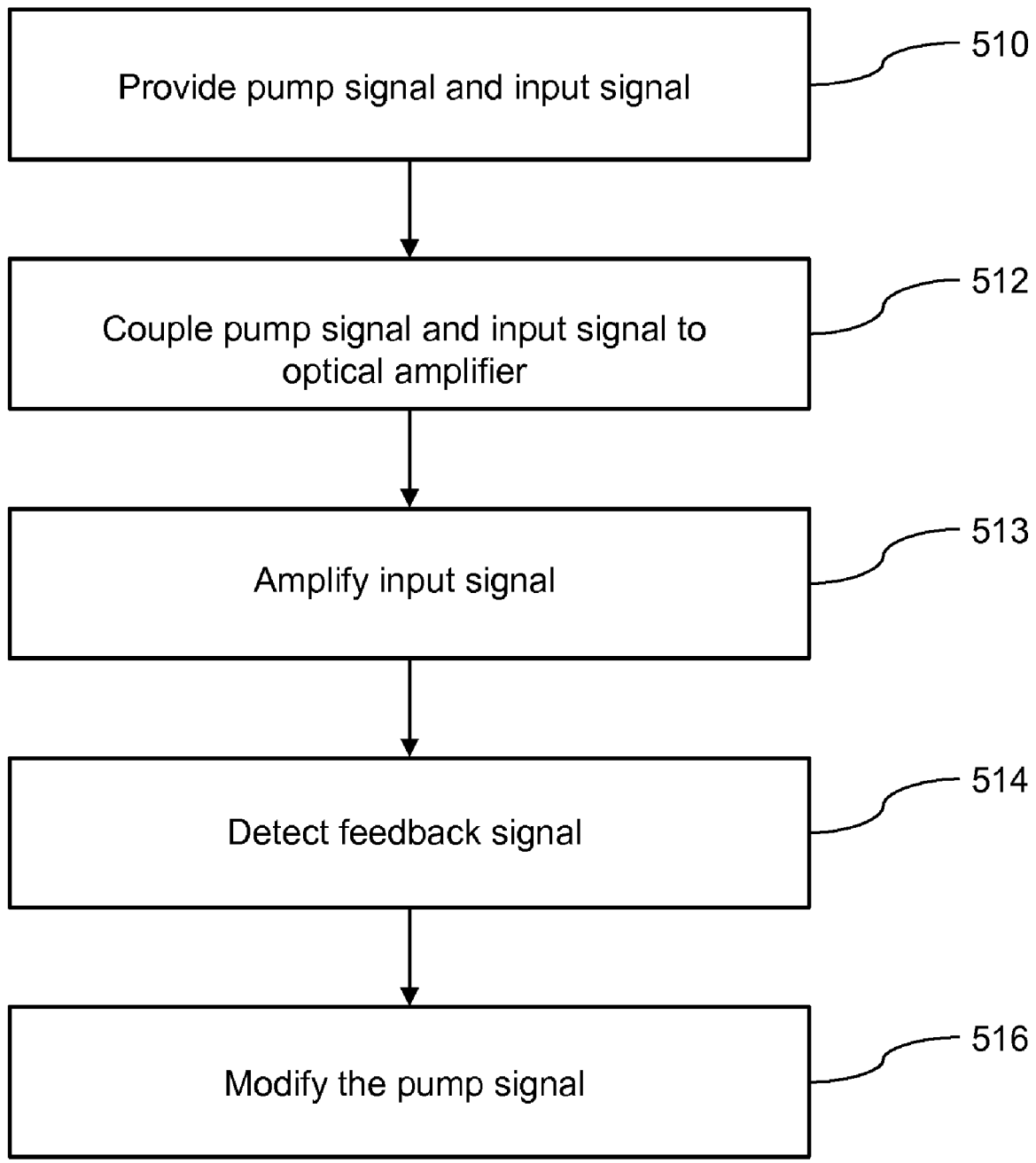
FIG. 5 is a simplified illustration of a method of operation of an optical amplifier according to an embodiment of the present invention.

FIG. 5 is a simplified illustration of a method of operation of an optical amplifier according to an embodiment of the present invention. The method includes providing a pump signal at a pump wavelength and an input signal at a signal wavelength (510). In embodiments of the present invention, the pump signal is provided by one or more semiconductor pump lasers at a pump wavelength of about 976 nm or 915 nm and the signal wavelength is about 1064 nm. The input signal can be series of pulses with pulse repetition rates of about 0 to about 1 MHz. The method also includes coupling the pump signal and the input signal to an optical amplifier (512). Various techniques are known to one of skill in the art for coupling of the various input signals. For example, the coupling can be achieved with all-fiber pump combiners or using dichroic mirrors. The input signal is then amplified to provide output signal (513). In some embodiments of the present invention, the input signal is amplified by about 20 dB to about 30 dB. The method further includes detecting a feedback signal (514). The feedback signal can be a residual pump signal or an amplified spontaneous emission (ASE) signal detected at one output of the optical amplifier. For example, the residual pump signal or ASE signal can be detected by first separating the signals from the input or output signal using a wavelength selective device or by using a photosensitive device (e.g., a semiconductor photodetector). Additionally, the method includes modifying the pump signal depending on the level of the feedback signal (516).

It should be appreciated that the specific steps illustrated in FIG. 5 provide a particular method of operating an optical amplifier according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

While the present invention has been described with respect to particular embodiments and specific examples thereof, it should be understood that other embodiments may fall within the spirit and scope of the invention. It will be apparent to those skilled in the art that other alternatives, variations, and modifications are possible, and should be seen as being within the spirit and the scope of the invention. The scope of the invention should, therefore, be determined with reference to the appended claims along with their full scope of equivalents.

What is claimed is:

1. A method of operating an amplifier system, the method comprising:
    providing a pump signal at a pump wavelength, wherein the pump signal is a function of a pump power;
    providing an input signal comprising a first plurality of pulses;
    coupling the pump signal and the input signal to an optical amplifier, wherein the optical amplifier comprises a gain medium characterized by a gain value at a signal wavelength;
    amplifying the input signal to provide an output signal;
    detecting a feedback signal related to the gain value; and
    modifying the pump power based on the detected feedback signal, wherein the pump signal comprises a second plurality of pulses, each of the second plurality of pulses being characterized by a decreasing signal amplitude between at least a portion of a duration between consecutive pulses of the first plurality of pulses.

2. The method of claim 1 wherein providing a pump signal comprises producing an output from a semiconductor laser.

3. The method of claim 2 wherein the semiconductor laser comprises a multi-mode semiconductor laser.

4. The method of claim 1 wherein the optical amplifier comprises a core pumped fiber amplifier.

5. The method of claim 1 wherein the feedback signal comprises residual pump light.

6. The method of claim 1 wherein the feedback signal comprises ASE.

7. An amplifier system comprising:
    a pump source adapted to receive a drive signal and output a pump signal;
    an optical amplifier adapted to receive an input signal comprising a first plurality of pulses, the optical amplifier having an input coupled to the pump source and an output;
    a wavelength demultiplexer coupled to the output of the optical amplifier;
    a detector optically coupled to the wavelength demultiplexer; and
    a feedback system coupled to the detector and adapted to modify the pump signal for the pump source, wherein the pump signal comprises a second plurality of pulses, each of the second plurality of pulses being characterized by a decreasing signal amplitude between at least a portion of a duration between consecutive pulses of the first plurality of pulses.

8. The amplifier system of claim 7 wherein the pump source comprises a semiconductor laser operating at a pump wavelength.

9. The amplifier system of claim 7 wherein the drive signal comprises a baseline signal and an adjustment signal.

10. The amplifier system of claim 7 wherein the optical amplifier comprises a fiber amplifier.

11. The amplifier system of claim 10 wherein the fiber amplifier comprises an ytterbium-doped fiber.

12. The amplifier system of claim 7 wherein the wavelength demultiplexer is adapted to separate light at an input signal wavelength and the pump wavelength.

13. The amplifier system of claim 7 wherein the wavelength demultiplexer is adapted to separate light at an input signal wavelength and ASE co-propagating in the optical amplifier.

14. An amplifier system comprising:
    a pump source adapted to receive a drive signal and output a pump signal;
    an optical amplifier adapted to receive an input signal comprising a first plurality of pulses, the optical amplifier having an input coupled to the pump source and an output;
    a signal separator coupled to the input of the optical amplifier;
    a detector optically coupled to the signal separator; and
    a feedback system coupled to the detector and adapted to modify the pump signal for the pump source, wherein the pump signal comprises a second plurality of pulses, each of the second plurality of pulses being characterized by a decreasing signal amplitude between at least a portion of a duration between consecutive pulses of the first plurality of pulses.

15. The amplifier system of claim 14 wherein the pump source comprises a semiconductor laser operating at a pump wavelength.

16. The amplifier system of claim 14 wherein the drive signal comprises a baseline signal and an adjustment signal.

17. The amplifier system of claim 14 wherein the optical amplifier comprises a fiber amplifier.

18. The amplifier system of claim 14 wherein the sign separator is adapted to separate light at an input signal wavelength and ASE counter-propagating in the optical amplifier.

19. The amplifier system of claim 14 wherein the signal separator comprises a wavelength demultiplexer.

20. The amplifier system of claim 14 wherein the signal separator comprises an optical circulator.

21. The method of claim 1 wherein the input signal has a constant power for each of the first plurality of pulses such that the pump power has a constant pattern for each of the second plurality of pulses.

22. The amplifier system of claim 14 wherein the input signal has a constant power for each of the first plurality of pulses such that the pump power has a constant pattern for each of the second plurality of pulses.

23. The amplifier system of claim 14 wherein the feedback system is characterized by a bandwidth, the bandwidth being larger than a maximum pulsing rate of the input signal.

\* \* \* \* \*